United States Patent
Richardson

(10) Patent No.: US 8,668,349 B2
(45) Date of Patent: Mar. 11, 2014

(54) SOLAR POWERED ATTACHABLE LIGHT

(76) Inventor: Line C. Richardson, Airdrie (CA)

(*) Notice: Subject to any disclaimer, the term of this patent is extended or adjusted under 35 U.S.C. 154(b) by 259 days.

(21) Appl. No.: 13/349,704

(22) Filed: Jan. 13, 2012

(65) Prior Publication Data
US 2013/0182420 A1  Jul. 18, 2013

(51) Int. Cl.
F21L 4/00 (2006.01)

(52) U.S. Cl.
USPC ............ 362/183; 362/396; 362/418; 362/285

(58) Field of Classification Search
USPC ......... 362/183, 396, 418, 285, 421, 427, 368, 362/287, 197, 372
See application file for complete search history.

(56) References Cited

U.S. PATENT DOCUMENTS

| 5,055,984 | A | * | 10/1991 | Hung et al. ................ 362/183 |
| 5,211,470 | A | | 5/1993 | Frost et al. |
| 5,217,296 | A | * | 6/1993 | Tanner et al. .............. 362/183 |
| 5,280,220 | A | | 1/1994 | Carter |
| 5,690,412 | A | * | 11/1997 | Sheldon .................... 362/104 |
| 6,082,877 | A | | 7/2000 | Hughes |
| 6,951,408 | B2 | * | 10/2005 | Stewart .................... 362/183 |
| 6,953,259 | B2 | * | 10/2005 | Parsons et al. ............ 362/191 |
| 7,334,913 | B1 | | 2/2008 | Chen |
| 7,674,002 | B1 | | 3/2010 | Wang |
| 7,819,545 | B2 | | 10/2010 | Ponamar |
| 2008/0106891 | A1 | * | 5/2008 | Lee ........................... 362/183 |
| 2008/0170389 | A1 | | 7/2008 | Lavigne |
| 2011/0007497 | A1 | * | 1/2011 | Liao ......................... 362/183 |
| 2012/0155068 | A1 | * | 6/2012 | Hsu .......................... 362/183 |

* cited by examiner

Primary Examiner — Bao Q Truong
(74) Attorney, Agent, or Firm — Montgomery Patent & Design; Robert C. Montgomery

(57) ABSTRACT

A solar-powered attachable light is adapted for use as a holiday decoration and includes a lamp pivotably mounted to an enclosure. A solar cell charges an internal rechargeable battery during daytime hours and the rechargeable battery powers the lamp during nighttime hours. A rear of the enclosure includes a clip assembly for removable attachment of the device to various outdoor structures. The device eliminates the presence of wires and the requirement of connection to a fixed power source in a manner particularly beneficial when simultaneously arranging decorative outdoor lighting in a variety of locations.

18 Claims, 3 Drawing Sheets

SOLAR POWERED ATTACHABLE LIGHT

FIELD OF THE INVENTION

The present invention relates generally to decorative lights, and in particular, to a solar-powered and rechargeable light having a position adjustable lamp that is attachable to variety of support structures.

BACKGROUND OF THE INVENTION

Festive lighting products are known. While these lighting products are effective, they still require connection of an electrical source and positioning upon elevated surfaces each of which tend pose as safety concerns. Existing lighting products require proper positioning and arranging of each light to illuminate a desired area which can be time consuming Additionally, the existing lighting products are troublesome to safely secure to a structure.

Various attempts have been made to provide solar-powered attachable lights. Examples of these attempts can be seen by reference to several U.S. patents. U.S. Pat. No. 8,002,427, issued in the name of Lavigne, describes a solar rechargeable decorative light.

U.S. Pat. No. 5,055,984, issued in the name of Hung et al., describes a solar rechargeable light for illuminating a ground or wall section.

U.S. Pat. No. 7,674,002, issued in the name of Wang, describes a portable solar-powered light source.

While these attempts may fulfill their respective, particular objectives, each of these references suffer from one (1) or more disadvantages. Many are not suited to provide omni-directional positioning of the light. Others are limited and provide only a single attachment feature.

SUMMARY OF THE INVENTION

The inventor has recognized the aforementioned inherent problems and lack in the art and observed that there is a need for an attachable illumination device that provides the fun and enjoyment of holiday light decorations without the drawbacks associated with electrical power connections.

Accordingly, it is an object of the present embodiments of the invention to solve at least one (1) of these problems. The inventor has addressed this need by developing a solar powered attachable light that provides a cost effective and safe way to operate holiday lighting displays without the cost and aggravation associated with conventional light strings. The inventor has thus realized the advantages and benefits of providing an omni-directional lamp that is rechargeable by a solar cell having the ability to be attached to various support features in a multiple of ways.

To achieve the above objectives, it is a feature of the present invention to provide an individual solar powered attachable light that is powered by a solar cell attached to an exterior of a housing enclosure. The solar panels charge a battery which energizes the light.

Another feature of the present invention is to provide an attachment feature having a spring actuated clip assembly attached to a side surface of the enclosure.

Yet still another feature of the present invention is to provide another attachment feature having a ring located on a bottom surface of the enclosure.

Yet still another feature of the present invention is to have a controller to provide a microprocessor-based module to enable the solar cell to automatically charge the battery.

Yet still another feature of the present invention is to attach a lamp to an omni-directional positioning holder which is manipulated via a ball-and-socket joint.

Yet still another feature of the present invention is to provide a method of utilizing the device that provides a unique means of utilizing the clip assembly or ring to suspend the device, allowing the solar cell to charge the battery, and, benefiting from decorative illumination of the lights during periods of low lit conditions.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

Figure 1:
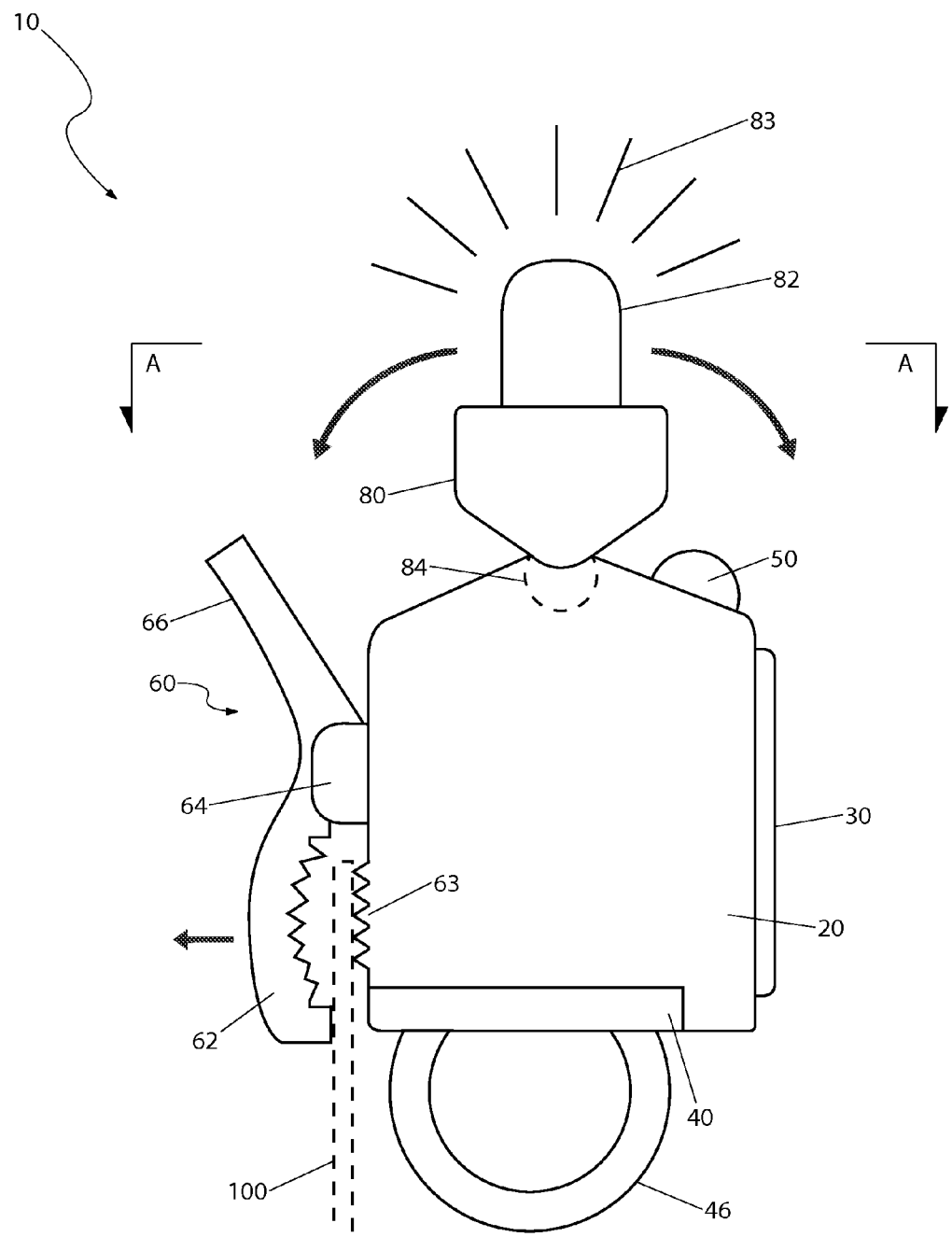
FIG. 1 is a side view of a solar-powered attachable light in accordance with the present invention.

10 solar-powered attachable light
20 enclosure
22 controller
30 solar cell
40 battery holder
42 battery
44 battery contact
46 ring feature
50 light sensor
60 clip assembly
62 movable jaw
63 stationary jaw
64 axle hinge
66 handle actuator
68 spring
80 lamp holder
82 lamp
83 illumination
84 ball joint
85 socket
100 object
105 wiring

DETAILED DESCRIPTION OF THE PREFERRED EMBODIMENT

Figure 2:
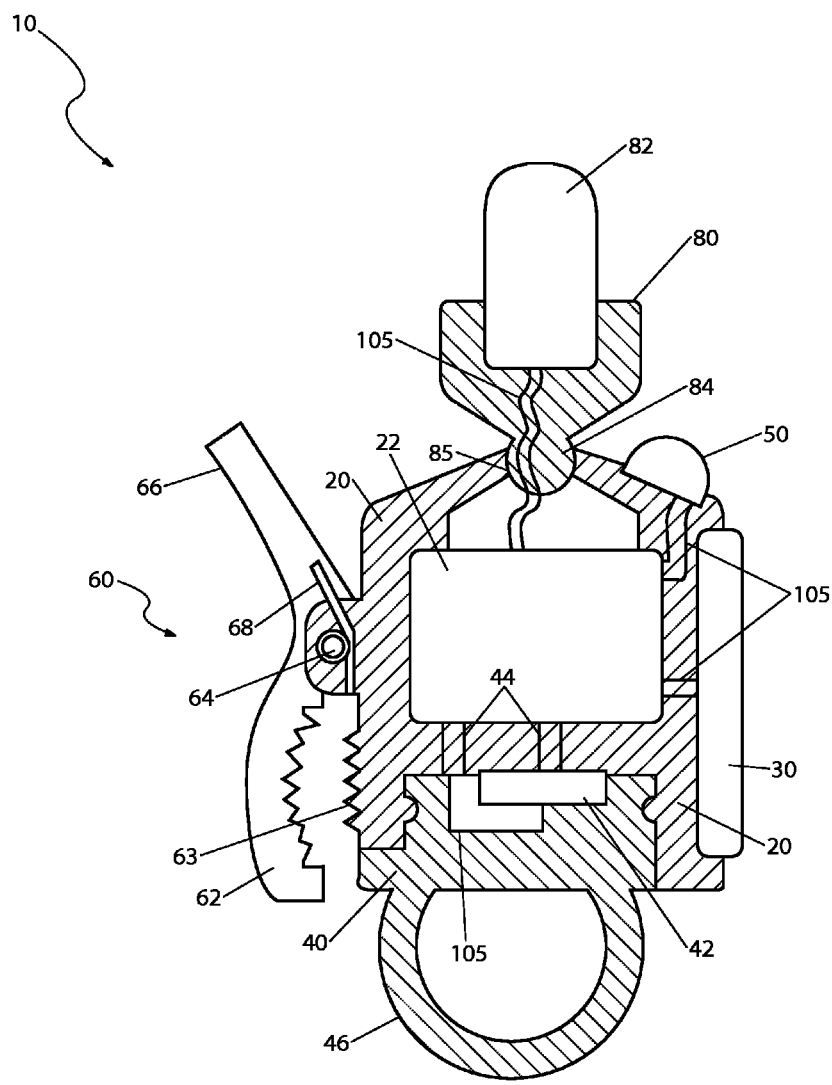
FIG. 2 is a section view of the solar-powered attachable light taken along section line A-A of FIG. 1; and, FIG. 3 is an electrical block diagram depicting the major electrical components of the solar-powered attachable light.
Figure 3:
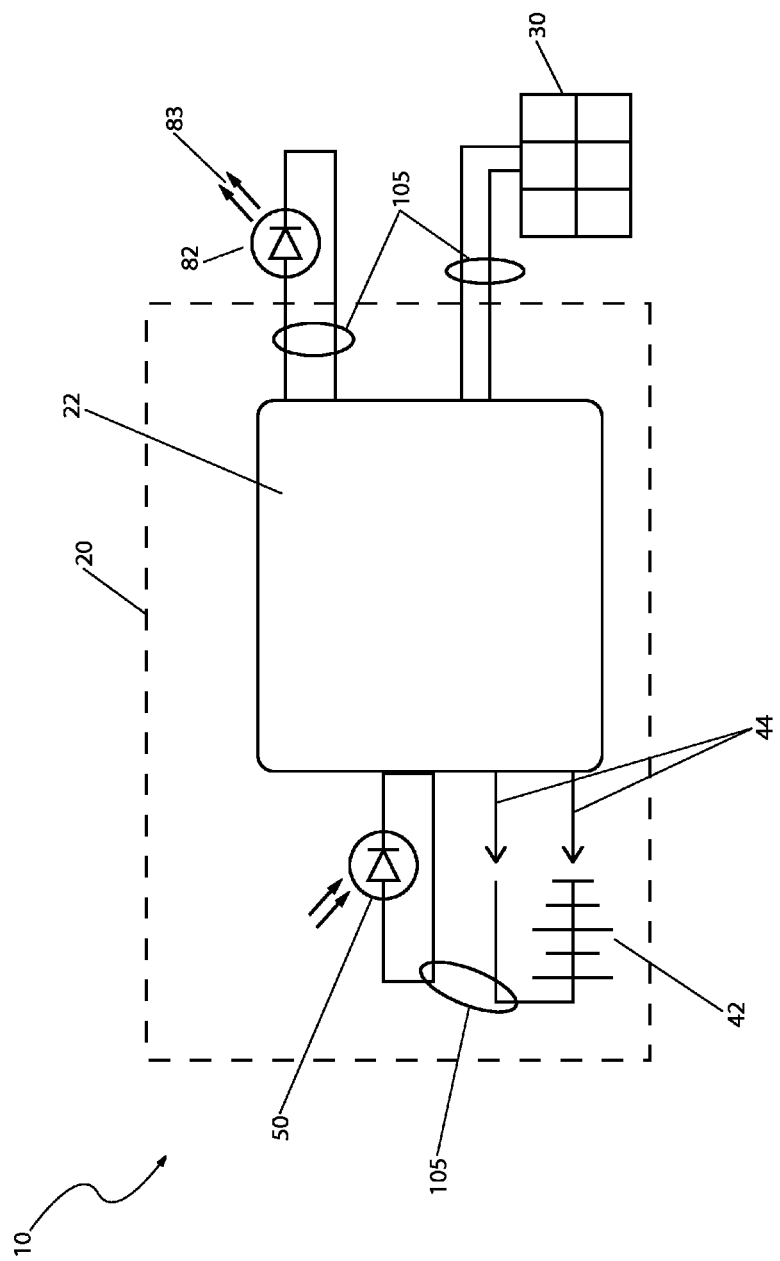

In accordance with the invention, the best mode is presented in terms of a preferred embodiment, herein depicted within FIGS. 1 through 3. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 3, depicting a solar-powered attachable light (herein described as a "device") 10, where like reference numerals represent similar or like parts. In accordance with the invention, the present disclosure describes the device 10 providing an individual solar-charged, battery powered illuminating lamp 82 used for holiday decorating or the like.

FIG. 1 shows a side view of the device 10 including a pivoting lamp 82 mounted on top of a small plastic enclosure 20. At least one (1) exterior face of the enclosure 20 is provided with a small solar cell 30 being approximately one-half (½) inch in width and one (1) inch in length. Another side surface of the enclosure 20 is provided with a spring-loaded clip assembly 60 for attaching the device 10 to various objects 100 during use. It is envisioned that a plurality of devices 10 would be purchased and applied to trees, bushes, gutters, railings, house outlines, or anywhere conventional holiday lights are typically applied. The device 10 provides additional versatility by eliminating the presence of wires as well as providing automatic on and off functionality. The lamp 82 is a light emitting diode (LED) or equivalent illumination source and is to be introduced in a variety of illuminating colors.

The device 10 can be introduced in various packaged quantities such as twelve (12), twenty-five (25), fifty (50), and so forth.

FIG. 2 shows a section view of the device 10 taken along section line A-A of FIG. 1. The enclosure 20 provides a weather-proof housing for the internal electronic and electrical components necessary to the operation of the device 10. Housed within the enclosure 20 are an electronic controller 22 which is in electrical communication with the solar cell 30, a rechargeable battery 42, a light sensor 50, and the lamp 82, as well as internal wiring 105 to electrically connect all components.

The controller 22 is microprocessor-based computing module having electronic components and embedded software which work in conjunction with the externally disposed and integral light sensor 50. The solar cell 30 automatically charges the small internal rechargeable battery 42 during daytime hours. The rechargeable battery 42 automatically powers the lamp 82 during nighttime hours when electrically actuated by the light sensor 50.

The lamp 82 is permanently inserted and affixed within a lamp holder 80 with adhesives, potting materials, or the like. The lamp holder 80 is pivotably connected to the enclosure 20 and provides omni-directional movement and positioning of the lamp 82 relative to the enclosure 20. The pivot connection between the lamp holder 80 and the enclosure 20 is a mechanical ball joint 84 and socket 85 connection. The ball joint 84 also includes an access pathway to internally route the wiring 105 from the lamp 82 to the controller 22 along a center longitudinal axis.

A battery holder 40 is also provided including a circular, molded plastic part which snaps upwardly into an open bottom end of the enclosure 20. The battery holder 40 has a female feature along a top surface to nest the small rechargeable battery 42 which in turn provides incidental electrical contact with a pair of superjacent battery contacts 44 disposed within an interior of the enclosure once inserted into the enclosure 20. The battery contacts 44 are a pair of brass or copper strap-like conductors in electrical communication with the controller 22. The battery holder 40 also includes a molded-in circular ring feature 46 which protrudes downwardly along a bottom surface for attachment of the device 10 to various insertable objects 100, such as tree branches, cord, or the like.

The clip assembly 60 is located along a side surface of the enclosure 20, preferably at an opposite side as the solar cell 50. The clip assembly 60 includes a movable jaw 62, a stationary jaw 63, an axle hinge 64, a handle actuator 66, and a spring 68. The movable jaw 62 and the actuator handle 66 jointly form a downwardly extending "S"-shaped member pivotably attached to the enclosure 20 at an intermediate location by the axle hinge 64. A torsion spring 68 is wrapped around the axle hinge 64 and includes an end in mechanical contact with and acts upon the actuator handle 66 and an opposing end in contact with the enclosure 20. The force of the spring 68 biases the jaw 62 of the clip assembly 60 in a closed position. Upon receiving a force applied to the actuator handle 66, the movable jaw 62 separates from a stationary jaw 63 disposed on the body of the enclosure 20. Once the jaws 62, 63 are in an open position, any support object 100 can be inserted which is in turn clamped between the jaws 62, 63 upon by release of the actuator handle 66.

FIG. 3 shows an electrical block diagram of the device 10 depicting the major electrical components. The device 10 receives power from the rechargeable battery 42. The rechargeable battery 42 is in electrical communication with and provides power to the controller 22, the light sensor 50, and the lamp 82. The controller 22 provides board-level electronics to manage power received from the photovoltaic solar cell 30 during daylight hours and controls the charging of the battery 42. A current from the battery 42 is utilized to power the lamp 82 during periods of low light in an automatic alternating day-to-night fashion. Light and dark hours are sensed and communicated to the controller 22 via the light sensor 50. The light sensor 50 is a photosensitive diode device.

It can be appreciated by one skilled in the art that other styles and configurations of the invention can be easily incorporated into the teachings of the present disclosure and only one particular configuration has been shown and described for purposes of clarity and disclosure and not by way of limitation of scope.

In accordance with the invention, the preferred embodiment can be utilized by the user in a simple and effortless manner with little or no training After initial purchase or acquisition of the device 10, it is installed and utilized as indicated in FIGS. 1 through 3.

The method of installing and utilizing the device 10 can be achieved by performing a series of steps. It can be appreciated that the steps described can be performed in alternative order and as such should not be viewed as a limiting factor. Procuring a packaged plurality of devices 10 having lamps 82 of a desired color or colors. Utilizing the clip assembly 60 to fasten and arrange each device 10 upon a tree, bush, gutter, railing, house outline, or anywhere conventional holiday lights are typically applied. Allowing the devices 10 to charge the battery 42 during daylight hours. Benefiting from decorative illumination 83 of the lamps 82 during periods of low light in an automatic alternating day/night cycle.

The devices 10 can also be affixed to additional types of appendages such as tree branches or strung along cords, by inserting the tree branches or routing the cord through the ring feature 46 in lieu of or in combination with the clip assembly 60.

The lamps 82 of each device 10 can also be oriented to project illumination 83 to a desired configuration by orienting each lamp 82 relative to the enclosure 20 via the ball joint 84 and socket 85 feature.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A solar powered attachable light comprising:
   an enclosure;
   a lamp pivotably connected to an upper end of said enclosure;
   an electronic controller disposed within said enclosure and electrically connected to said lamp;
   a rechargeable battery disposed within said enclosure and electrically connected to said controller for providing electrical power to said lamp;
   at least one solar cell affixed to a side surface of said enclosure and electrically connected to said controller for charging said battery;
   a light sensor mounted to an exterior surface of said enclosure and electrically connected to said controller for automatically actuating said lamp in response to a low light condition; and,
   a clip assembly hingedly mounted to an opposing side surface of said enclosure.

2. The device of claim 1, wherein said pivot connection further comprises a ball and socket joint.

3. The device of claim 2, wherein said pivot connection further comprises an access pathway through said pivot connection for electrically connecting said lamp and said controller.

4. The device of claim 1, wherein said clip assembly further comprises:
   a generally S-shaped clip arm comprising an outwardly protruding handle actuator disposed on an upper end and a movable jaw disposed on a lower end;
   an axle hinge for hingedly connecting said clip arm to said enclosure;
   a spring disposed around said axle hinge comprising an end acting upon said handle actuator and an opposing end acting upon said enclosure for biasing said clip arm in a closed position.

5. The device of claim 4, wherein said enclosure further comprises a stationary jaw disposed on an exterior surface adjacent to said movable jaw.

6. The device of claim 1, wherein said lamp comprises at least one light-emitting diode.

7. The device of claim 1, wherein said lamp further comprises a lamp holder adjustably connected to said enclosure by a pivot connection for nesting said lamp.

8. The device of claim 7, wherein said lamp holder further comprises a joint ball disposed on a lower end; and,
   said enclosure further comprises a joint socket disposed on an upper end for adjustably receiving said joint ball.

9. The device of claim 8, further comprising an access pathway through said joint ball and said socket for electrically connecting said lamp and said controller.

10. The device of claim 1, wherein said controller further comprises embedded circuitry for controlling actuation of said lamp via said light sensor and for charging said battery via said solar cell.

11. The device of claim 1, wherein said enclosure further comprises a ring feature protruding from a bottom surface.

12. A solar powered attachable light comprising:
    an enclosure comprising a joint socket disposed on an upper end and an open bottom end;
    a lamp holder comprising a joint ball disposed on a lower end adjustably connected to said joint socket;
    a lamp rigidly mounted within said lamp holder;
    an electronic controller disposed within said enclosure and electrically connected to said lamp;
    a rechargeable battery disposed within said enclosure and electrically connected to said controller for providing electrical power to said lamp;
    at least one solar cell affixed to a side surface of said enclosure and electrically connected to said controller for charging said battery;
    a light sensor mounted to an exterior surface of said enclosure and electrically connected to said controller for automatically actuating said lamp in response to a low light condition;
    a clip assembly hingedly mounted to an opposing side surface of said enclosure;
    a battery holder removably connected to said enclosure bottom end for retaining said battery within said enclosure; and,
    a ring feature protruding from a bottom surface of said battery holder.

13. The device of claim 12, wherein said clip assembly further comprises:
    a generally S-shaped clip arm comprising an outwardly protruding handle actuator disposed on an upper end and a movable jaw disposed on a lower end;
    an axle hinge for hingedly connecting said clip arm to said enclosure;
    a spring disposed around said axle hinge comprising an end acting upon said handle actuator and an opposing end acting upon said enclosure for biasing said clip arm in a closed position.

14. The device of claim 13, wherein said enclosure further comprises a stationary jaw disposed on an exterior surface adjacent to said movable jaw.

15. The device of claim 14, further comprising an access pathway through said joint ball and said socket for electrically connecting said lamp and said controller.

16. The device of claim 15, wherein said controller further comprises embedded circuitry for controlling actuation of said lamp via said light sensor and for charging said battery via said solar cell.

17. The device of claim 16, wherein said lamp comprises at least one light emitting diode.

18. The device of claim 12, wherein said lamp comprises at least one light-emitting diode.

* * * * *